(12) United States Patent
Willcock et al.

(10) Patent No.: US 7,684,028 B2
(45) Date of Patent: Mar. 23, 2010

(54) REMOTE SENSING DIGITAL ANGLE GAUGE

(75) Inventors: Kevin Willcock, Shelby Township, MI (US); Michael Shevela, Harrison Township, MI (US); Michael F. Banar, Sterling Heights, MI (US)

(73) Assignee: SPX Corporation, Charlotte, NC (US)

( * ) Notice: Subject to any disclaimer, the term of this patent is extended or adjusted under 35 U.S.C. 154(b) by 582 days.

(21) Appl. No.: 11/638,531

(22) Filed: Dec. 14, 2006

(65) Prior Publication Data

US 2008/0147345 A1    Jun. 19, 2008

(51) Int. Cl.
*G01B 11/26* (2006.01)
*G01B 5/00* (2006.01)
*G01J 1/00* (2006.01)

(52) U.S. Cl. .................. 356/213; 356/139.09; 356/218; 356/138; 33/288; 33/286

(58) Field of Classification Search .................. 356/213, 356/218, 139.09, 153, 155; 33/288, 286, 33/203.18, 501
See application file for complete search history.

(56) References Cited

U.S. PATENT DOCUMENTS

| | | | |
|---|---|---|---|
| 4,381,548 A * | 4/1983 | Grossman et al. ............. 701/29 |
| 5,329,452 A | 7/1994 | Kercheck et al. | |
| 5,978,077 A * | 11/1999 | Koerner et al. .......... 356/139.09 |
| 5,999,867 A * | 12/1999 | Rogers et al. ................. 701/29 |
| 6,661,505 B2 * | 12/2003 | Jackson et al. ......... 356/139.09 |
| 7,136,728 B2 * | 11/2006 | Larson et al. .................. 701/29 |
| 7,181,852 B2 * | 2/2007 | Bryan ..................... 33/203.18 |
| 7,265,821 B1 * | 9/2007 | Lawrence et al. ...... 356/139.09 |
| 7,355,687 B2 * | 4/2008 | Voeller et al. .......... 356/139.09 |
| 7,369,222 B2 * | 5/2008 | Jackson et al. ......... 356/139.09 |

\* cited by examiner

*Primary Examiner*—L. G Lauchman
(74) *Attorney, Agent, or Firm*—Baker & Hostetler LLP

(57) ABSTRACT

A remote sensing angle gauge includes a sensor responding to physical stimulus and transmitting a resulting impulse for measuring an angle, and a user interface separate and remote from said sensor and in communication with said sensor unit. The user interface receives a signal from the resulting impulse of said sensor unit, and determines the angle measurement according to the received signal from said sensor unit and inputted data from said interface unit. The inputted data by a user includes an offset and orientation of the sensor. The gauge can be zeroed before initiating the measurement. The sensor can be connected to the user interface through a detachable electrical connection. The sensor can include an adaptor accommodating a detachable and adjustable connection to an area being measured. The results of the measurement on the user interface can be remotely monitored, while measuring the angle with the sensor.

20 Claims, 6 Drawing Sheets

REMOTE SENSING DIGITAL ANGLE GAUGE

FIELD OF THE INVENTION

The present invention relates generally to a measurement apparatus and technique. More particularly, the present invention relates to an angle measurement apparatus and technique with a remote sensor.

BACKGROUND OF THE INVENTION

Accurate measurement of angles is important in a variety of fields including for example the manufacturing industries such as the automotive field. Measurement of such angles is also critical and difficult when being limited in confined spaces.

For example, proper alignment of wheels of an automotive vehicle is important for both proper handling of the vehicle, as well as proper tire wear. One of the wheel alignment parameters, which is measured and adjusted in order to achieve proper wheel alignment, is the caster angle.

Caster is an angle which the steering axis of a steerable wheel makes with respect to a vertical plane which is perpendicular to the longitudinal direction of the vehicles. The caster angle is considered positive when the steering axis is inclined rearward (in the upward direction) and negative when the steering axis is inclined forward. Caster can be measured by inclinometers attached to the wheel. To measure caster, the wheel is turned through an arc, and the difference in camber readings is used to derive the caster value. The camber angle is the inclination of the wheel plane with respect to the vertical. The camber angle is another parameter that is used for wheel alignment along with the caster angle.

Current wheel alignment tools are not able to accurately measure the caster angle in a convenient, efficient and accurate manner. Current angle measurement tools are large and the reading of measurements is difficult when measuring the angles due to low clearance or inaccessibility. For example, current angle gauges will not fit in confined spaces where the rear casters of the vehicles are located. Further, the current equipment is unable to include a remote display of the angle that is required when measuring in an inaccessible space, while displaying the measurement in a convenient and efficient manner.

Other wheel alignment tools can be placed underneath the car to take measurements of the angles. However, even laser range finders cannot get an accurate measurement.

In some recent models of vehicles, such as the 2006 versions of the PONTIAC SOLSTICE and SATURN SKY from GENERAL MOTORS, Inc., the vehicles have adjustable rear casters. In an effort to achieve mass reductions, GENERAL MOTORS made the decision to have a body rear structure that eliminated the rear frame. There is a need to measure the adjustable rear casters. However, the confined space available for the measurement of the caster angle and the size of the current tools make it very difficult to measure the angles. Thus the conventional tools cannot be used to measure angles, such as the caster angle of certain vehicles.

Accordingly, it is desirable to provide a technique and apparatus for measuring angles in confined spaces while still being able to display the measurement in a convenient manner for the user.

SUMMARY OF THE INVENTION

The foregoing needs are met, to a great extent, by the present invention, wherein in one aspect an apparatus and technique are provided that in some embodiments allows the user to measure angles in confined spaces while still allowing the user to efficiently input instructions and receive the angle measurements without interference.

In accordance with one embodiment of the present invention, a remote sensing angle gauge is provided, and can include a sensor unit including a sensor responding to physical stimulus and transmitting a resulting impulse for measuring an angle, and an interface unit separate and remote from the sensor unit and in communication with the sensor unit, the interface unit receiving a signal from the resulting impulse of the sensor unit, the interface unit determining the angle measurement according to the received signal from the sensor unit and inputted data from the interface unit.

In accordance with another aspect of the present invention, a method of remotely sensing an angle is provided, including setting a zero point with respect to an area being measured, receiving an offset value from an input unit and storing the offset value in a memory unit, receiving through an input unit a selection of an orientation of a sensor, and determining the angle measurement according to the data received from the sensor and input signals received for the offset value, and orientation of the sensor.

In accordance with yet another embodiment of the present invention, an apparatus for angle measurement is provided, and a sensor unit including a housing enclosing a sensor responding to physical stimulus and transmitting a resulting impulse for measuring an angle, and an interface unit in communication with the sensor unit, the interface unit receiving a signal from the resulting impulse of the sensor unit, the interface unit determining the angle measurement according to the received signal from the sensor unit and inputted data from the interface unit.

There has thus been outlined, ratherbroadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
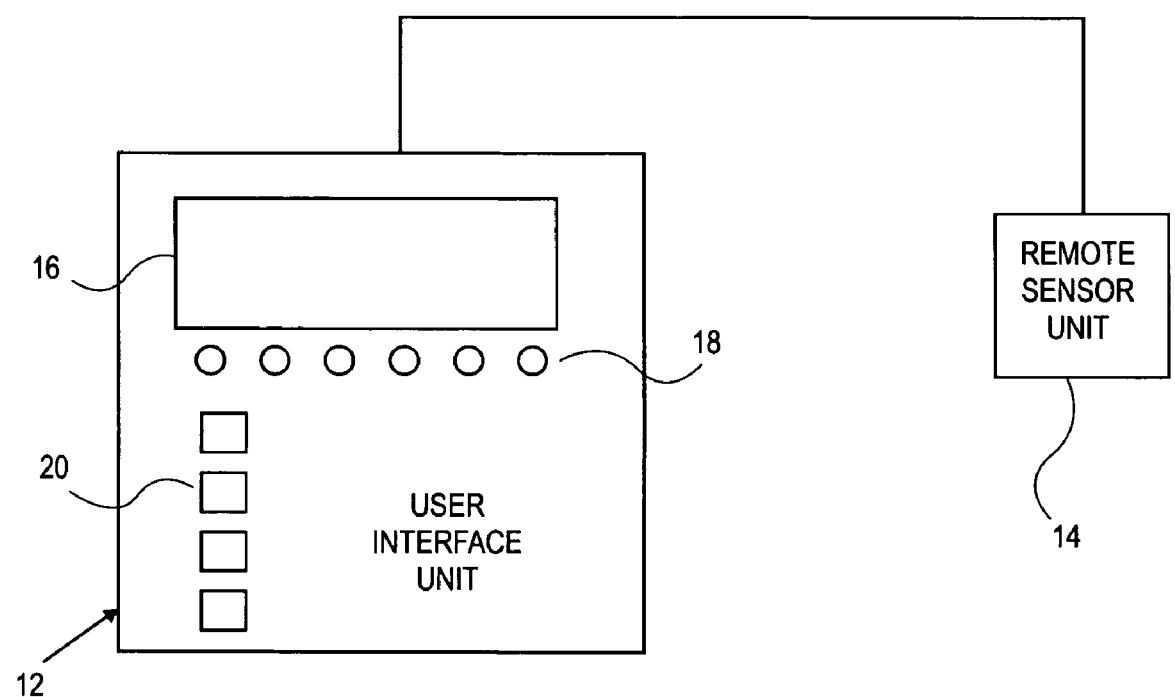
FIG. 1 is a perspective view illustrating a remote digital angle gauge according to a preferred embodiment of the invention.

The invention will now be described with reference to the drawing figures, in which like reference numerals refer to like parts throughout. An embodiment in accordance with the present invention provides a remote sensing angle gauge, including a remote sensor for measuring an angle, and a user interface separate and remote from the sensor and in communication with the sensor. The user interface receives a signal from the resulting impulse of the sensor, and the user interface unit determines the angle measurement according to the received signal from the sensor and inputted data from the user interface. The present invention also provides a technique of remotely sensing an angle, including setting a zero point with respect to an area being measured, receiving an offset value from an input unit and storing the offset value in a memory, receiving through an input unit a selection of an orientation of the sensor, and determining the angle measurement according to the data received from the sensor and input signals received for the offset value, and orientation of the sensor. Thus, the angle gauge and the technique of the angle gauge provide a user an accurate way to measure angles in confined spaces, efficiently input instructions and receive the measured angle measurements remotely without interference.

An embodiment of the present inventive apparatus is illustrated in FIG. 1. In one embodiment, the apparatus of the present invention is a digital angle gauge 10 with a user interface unit 12 and a sensor unit 14 (discussed below). The user interface 12 includes a display unit 16 and an array of indicators 18. The display unit 16 will display, for example, the angle measurement, while the array of indicators 18 will inform the user of the function being used (further discussed below). The display unit 16 can be a digital display. The display unit 16 can be, for example, a liquid crystal display or other display unit capable of displaying alphanumerical and/or numerical values.

Figure 2:
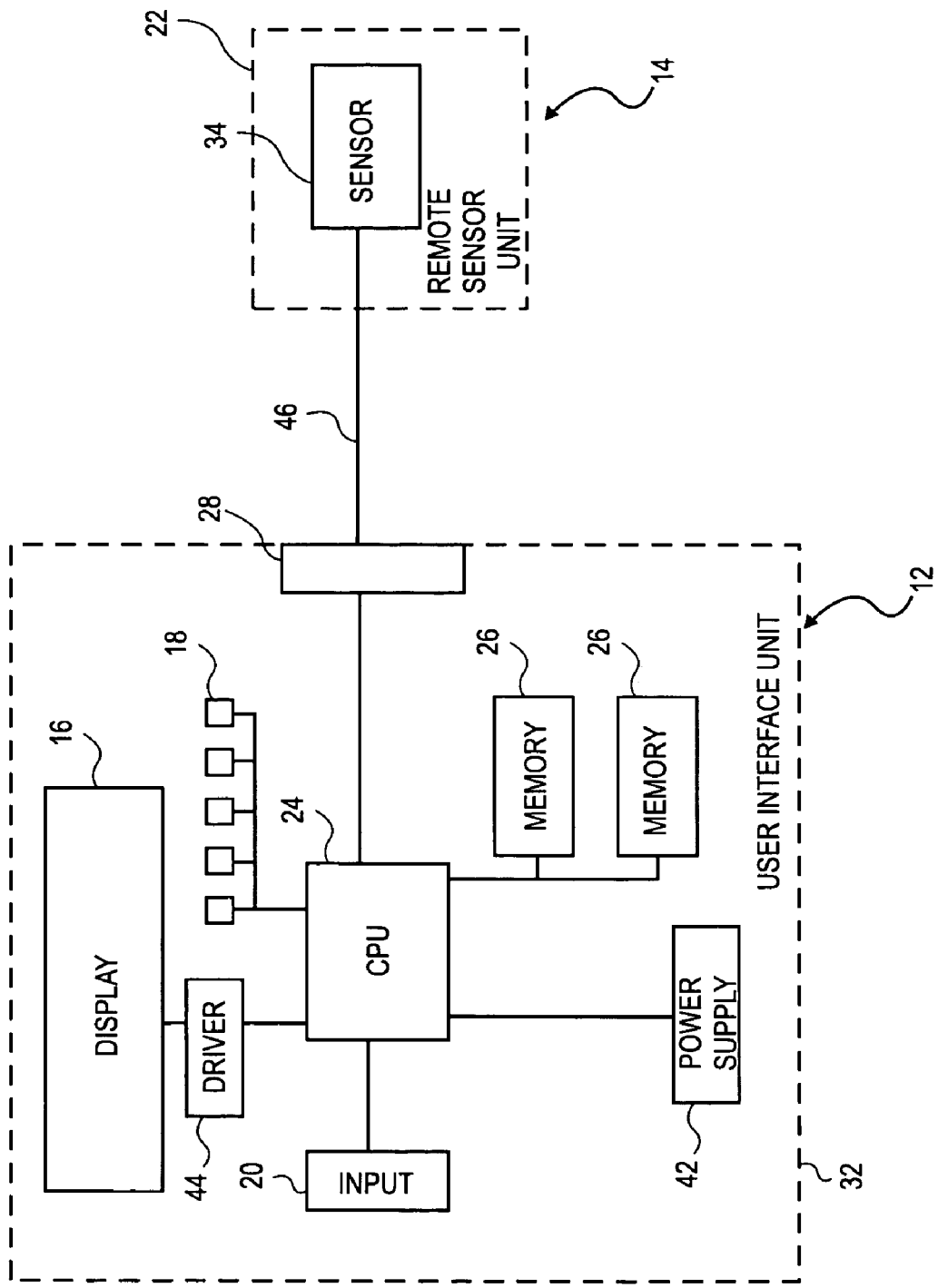
FIG. 2 is a block diagram of the internal modules of the remote digital angle gauge of FIG. 1.

FIG. 2 is a block diagram of the internal modules of the remote digital angle gauge of FIG. 1. The display 16 is controlled by a central processing unit 24 (discussed below) and by the driver 44. The array of indicators 18 can include, for example, light emitting diodes or other indicators capable of signaling to the user of the function being used. The user may select the different functions of the digital angle gauge through input keys such as the function up and down keys 20 and activate one of the input keys 20 for entering the selection. When a certain function is selected, the particular indicator such as the light emitting diode 18 is activated to show the function being used. Each one of the indicators 18 can be labeled to inform the user with regard to the significance of each one of the indicators 18. For example, one indicator 18 may stand for the angle measurement of the driver side, another represents the angle measurement for the passenger side, while a third indicator 18 can represent zeroing function and a fourth indicator 18 represents an offset function. Other functions can also be included that relate to the angle measurement. The different functions of the digital angle gauge 10 will be described below.

The sensor unit 14 can be connected to the user interface unit 12 through a wire or wirelessly. When the user interface unit is connected to the sensor unit through a wire 46 as seen in FIGS. 1 and 2, a coiled type cord such as a telephone type cord can be used to make the wire management efficient, while allowing the user to reach the sensor unit into certain confined spaces. The wire 46 between the sensor unit 14 and the user interface unit 12 can be a certain length and can be detachable or fixed as desired.

Figure 6:
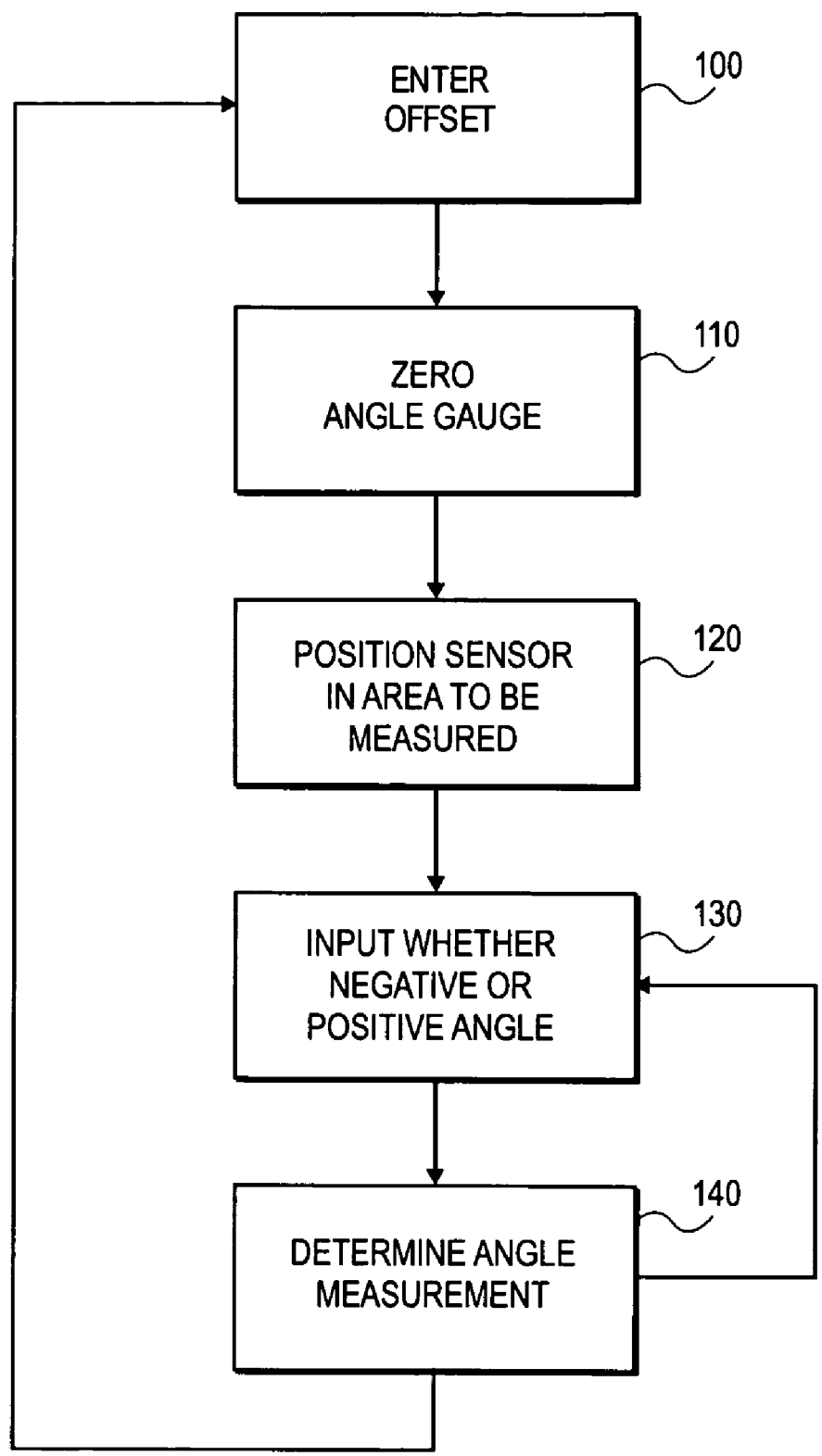
FIG. 6 illustrates the technique of determining the angle measurement in the remote sensing digital angle gauge.

Referring to FIG. 6, the sensor unit 14 can communicate wirelessly to the user interface unit 12 through wireless protocols such as BLUETOOTH, IEEE (Institute of Electrical and Electronic Engineers) 802.11, etc. The user interface unit 12 can also include a fastening portion 62 that allows the user interface unit 12 to be attached to a stationary object for a hands-free reading by the user while measuring the angle. For example, the fastening portion 62 can be a self-storing support such as a hook or other mechanism capable of hanging the user interface unit beneath the vehicles to be measured.

Turning back to FIG. 2, the user interface unit 12 of the digital angle gauge 10 includes the central processing unit (CPU) or controller 24 that controls the digital angle gauge 10. The CPU is connected with a memory unit 26 that stores data and instructions that are used by the digital angle gauge 10. The memory unit 26 can be a computer readable media. A user can input data and instruction into the digital angle gauge 10 through one of the keys in the input unit 20. The indicators 18 and display unit 16 are also controlled by the CPU 24. The user interface unit 12 is encased in an assembly 32. The digital angle gauge 10 can be powered by a power source 42, which can be a primary (non-rechargeable) battery such as an alkaline battery, or a secondary battery (rechargeable battery) such as a lithium ion, lithium polymer, nickel metal hydride (NiMH), etc. The power supply 42 can also be a connection to an external power source.

Through an interface 28 on the user interface unit 12, the interface unit 12 is connected to the sensor unit 14 by a wire 46 as seen in FIG. 2 or a wireless communication link as seen in FIG. 6. The sensor unit 14 is encased by an assembly 22 and includes a sensor 36. The sensor 34 can further include an accelerometer to sense change in the movement of the assembly 22. The change in movement is displayed as an angle measured in degrees via the display on the user interface unit 12. As states above, the sensor unit 14 can communicate the measured angles via a wire or wireless connection. The sensor 34 can also be detachable to accommodate the replacement of the sensor independent of the remote display in terms of the user interface unit 12. When the sensor unit 14 is wirelessly connected to the user interface unit 12, the remote sensor unit 14 can also include a power supply of its own. The sensor unit 14, for example, can be attached to the rear suspension on the vehicles, and used to measure the actual caster angle.

Figure 3:
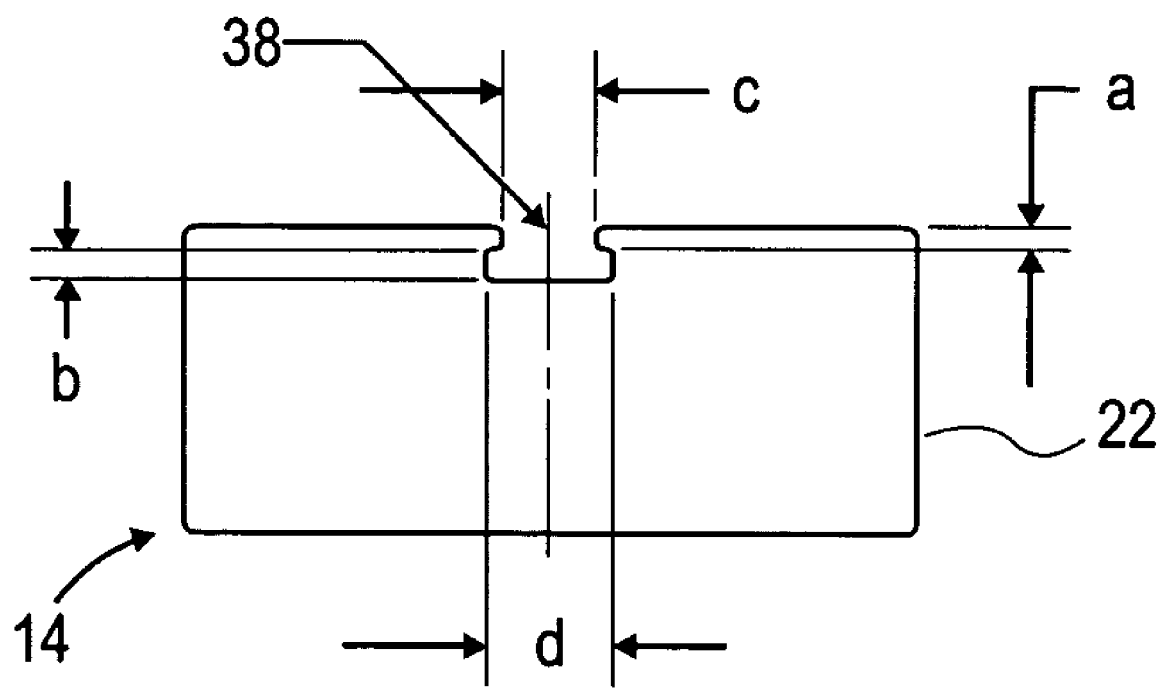
FIG. 3 is a top or bottom view of the remote sensor unit of FIG. 1.
Figure 4:
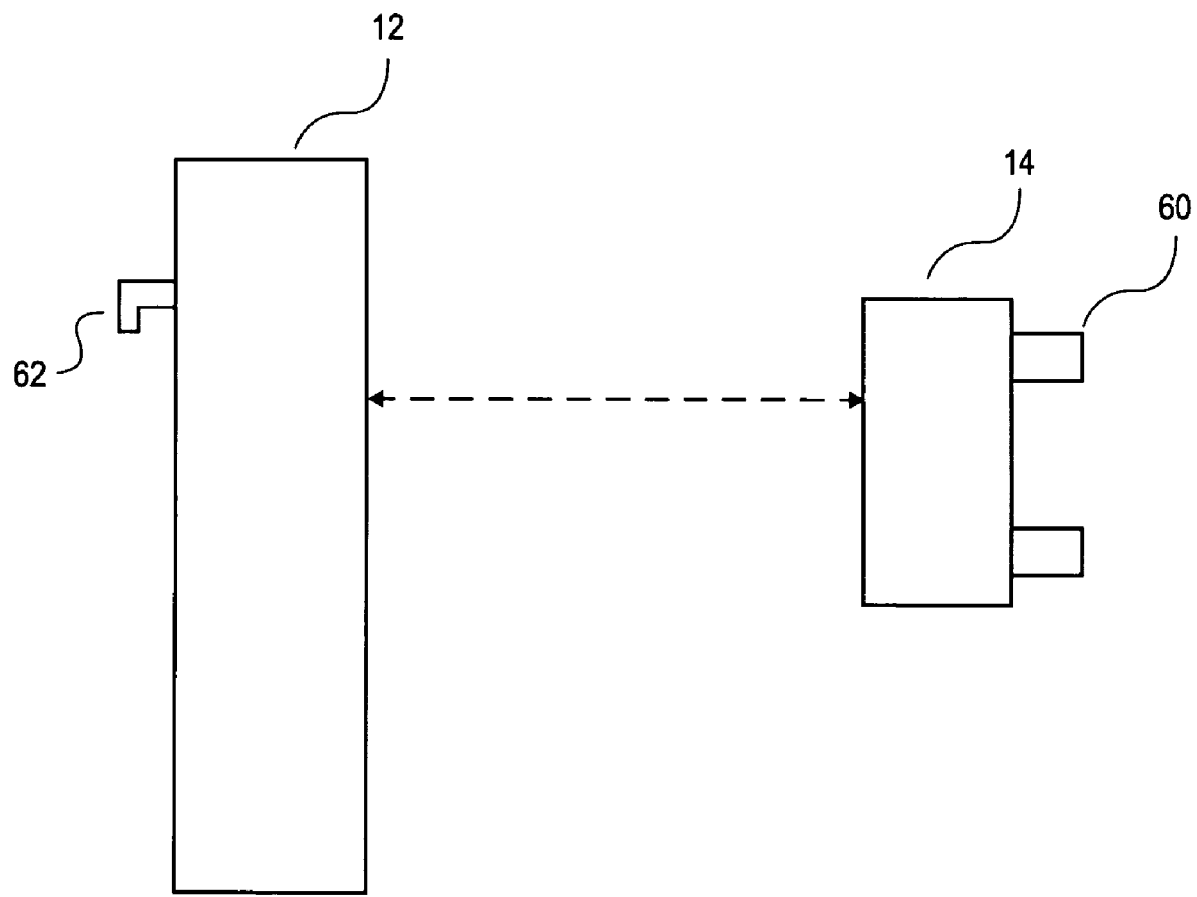
FIG. 4 is a side view of an alternative embodiment of the remote sensing digital angle gauge with an adaptor mechanism attachment.

The sensor unit 14 is further illustrated in FIGS. 3 and 4. Referring to FIG. 3, the sensor unit includes a notch 38 centered on the back of the housing 22. The notch 38 receives detachable pins 60 that allow the mounting of the sensor unit 14 to various parts of the vehicle in order for a user to take measurements in a more efficient manner. Mounting the sensor unit 14 in a confined space allows for a better measurement and the ability to reach into difficult to reach areas. The notch can include, for example, sections with thicknesses "a" and "b" and width "c" at the opening being greater than the thickness "d" at the closed portion of the notch. The notch 38 can have many other configurations and the above description in FIG. 3 is not limited to the configuration shown. The configuration of the assembly 22 of the sensor unit 14 is also not limited to such a configuration, but may include various other shapes and sizes. The sensor assembly can be small enough and be in certain shapes to accommodate being placed in certain confined areas such as regions in a vehicle that require an angle measurement and avoids any interference from other portions of the vehicle that would prohibit an accurate measurement of the angle.

Figure 5:
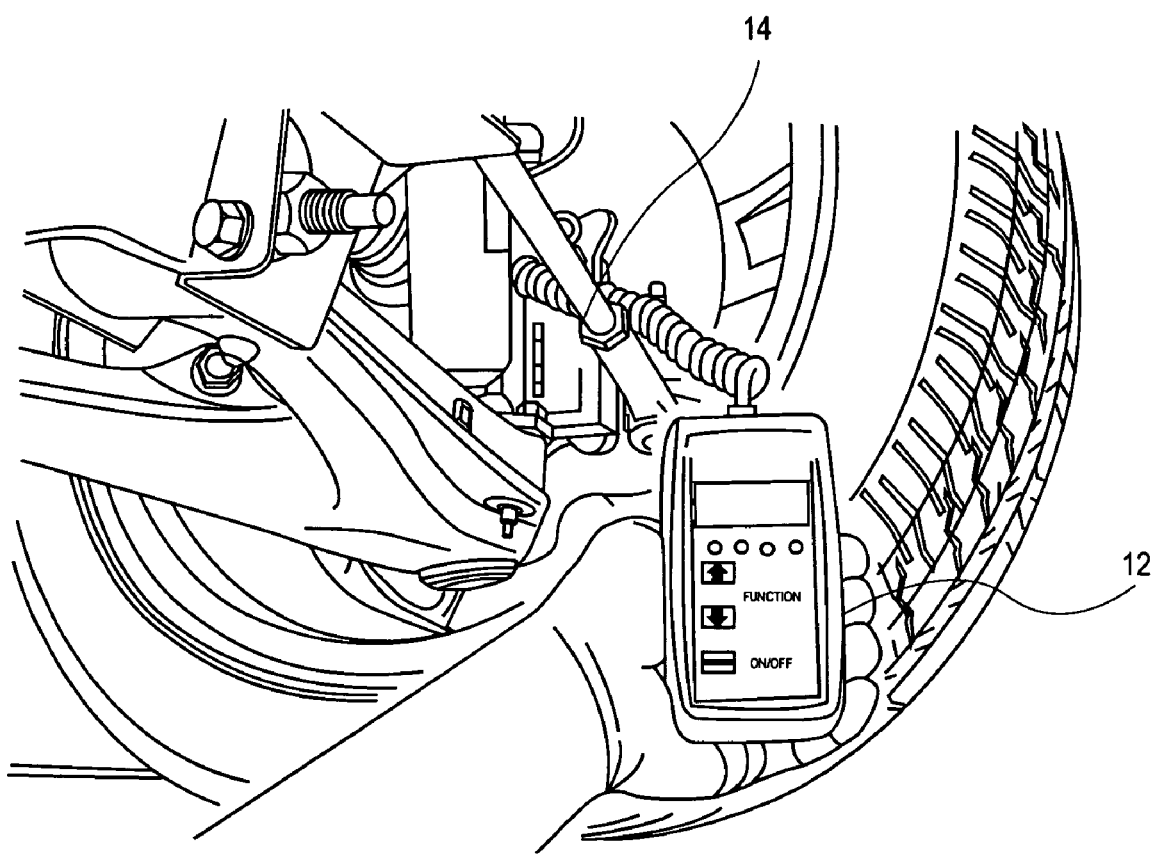
FIG. 5 illustrates the angle measurement in the area shown in FIG. 4.

Referring to FIG. 5, the sensor unit 14 can be placed in confined space to measure an angle, while still allowing a user to monitor the angle measurement in a viewable location outside of the confined space through the separately located user interface unit 12. As seen in FIG. 5, the small remote sensor 36 in the small sensor unit 14 accommodates for accurate angle measurements where conventional gages will not fit. Current wheel alignment tools do not allow for measuring the rear caster, but as seen in FIG. 5, the angle of the rear caster and a variety of other angle measurements can be made. The separation of the sensor unit 14 from the user interface 12 allows the remote use of the sensor 34 so that the user can measure angles where conventional inclinometers and angle meters will not fit.

The applications for measuring angles are not limited to the caster angle in vehicles. A plurality of other types of angle measurements can be made. The digital angle gauge 10 is universal in its application. The digital angle gauge, for example, can be used for the GENERAL MOTORS Y car and any other non-steerable (rear axle) caster angle measurement, steering wheel angle measurement, driveshaft angle measurement, and frame angle measurement, etc. An example of the angle measurement taken by the present invention is the measurement of the rear caster. Other uses include placing the gauge 10 on a building to measure any desired angles, use any type of vehicle, etc. Furthermore, the caster angle can be measured at any corner (wheel) of the vehicle.

Referring to FIG. 6, at step 100, a user can activate the offset button by using one of the input keys 20, thus lighting up one of the plurality of indicators 18 showing that the offset is being selected. The offset number is entered so that the user can get the proper reading of the gauge 10 as related to the service manual. For example, when the service manual states that the castor has to be three degrees positive, and the steering knuckle is cocked three degrees negative, then if the user were to measure from the zero point, the gauge would instead read zero. Therefore, rather than obtain such a reading, the user can enter an offset number so the user can get a proper reading from the gauge 10 as related to the service manual. If a user knows at zero, dead center (e.g., the position of a crank when it is in line with the connecting rod and not exerting torque), and a user knows that the steering knuckle is cocked a certain amount of degrees, a user can type the offset number in the user interface unit 12. The offset number is stored in the memory unit 26 for use by the CPU 24.

At step 110, and referring to FIG. 6, the sensor unit 14 can be placed on the hoist that the vehicle is on and zeroed (step 110). A user may place the sensor on the hoist itself, and zero the sensor accordingly. The zeroing gives the starting point between the level of the vehicle and level of the earth so that there is a zeroing of the gauge 10 in relationship to the hoist that the vehicle is on and the vehicle itself. Alternatively, the offset can be entered after zeroing the gauge 10, and therefore, steps 100 and 110 can be interchanged. The plurality of indicators 18 indicates to the user the selected menu, including illuminating a certain indicator when offset or zeroing is selected through the input keys 20.

At step 120, the user would position the sensor unit in the area to be measured. For example, the sensor unit 14 can be positioned in the vehicle to measure the angle, as seen in FIG. 5. Other examples include placing the sensor unit having the pins 60 (FIG. 4) in machined holes in the area to be measured in order to accommodate proper attachment. A wide variety of adaptors can be used for the specific area or purpose of measurement.

As another example, but not limited by such a configuration, two dowel pins 60 are placed on the back portion of the sensor unit 14. The sensor unit 14 is slotted and has a t-slot 38 as seen in FIG. 3. The two pins 60 fasten into the mating of the t-slot 38, and the two pins 60 fit into the holes in the knuckle of the vehicle as seen in FIG. 5. The sensor unit 14 can be attached to the knuckle or spindle assembly. The gauge 10 with the t-slot 38 and pins 60 can accommodate any distance between the holes up to the limit of the length of the sensor unit 14. Different center to center distances can be included for the pins 60 depending on the application.

The adaptor increases the universal applicability of the gauge 10 to a variety of different uses. The adaptor mechanism such as the pins 60 is adjustable and replaceable. An adaptor unit does not have to be used, but accommodates a fastening to an area to be measured, thus allowing user to free a hand when reading the measurement.

The adapter mechanism 60 can also be positioned relative to the sensor 34. For example, as seen in FIG. 3, the notch 38 is centered on the back of the sensor housing allowing an accurate reading. The sensor unit 14 can be mounted with multiple adapters to accommodate the gauge 10 to fit in a variety of purposes including for example present and future vehicle applications.

Referring back to FIG. 6, at step 130 the user would then enter in the user interface unit 12 whether negative or positive angle of the castor. The driver side or passenger side is selected depending on the orientation of the sensor, thus giving a positive or negative reading. The appropriate indicator 18 would illuminate to indicate whether the passenger or driver side is selected.

At step 140, the gauge 10 then determines the angle measurement and displays the information on the display unit 16 for reading by the user away from where the angle is being measured and/or in a location that the display unit is easy to read. The angle measurement is determined by the CPU 24 with access to the memory unit 26, through the information received from the accelerometer sensor 36. The information from the accelerometer sensor 36 is received through the interface 28 on the user interface unit 12. The display unit 16 indicates whether the caster angle is positive or negative at any corner (wheel) of the vehicle.

The angle measurement can be stored in the memory 26 or it can be not stored in the memory 26, but simply displayed on the display unit 16 for an indefinite or certain period of time, or until the gauge 10 is re-zeroed.

The gauge 10 is re-zeroed to accommodate another vehicle or other application. For example, different vehicles have different weights that would tilt the hoist in one direction or another and so the gauge should be re-zeroed again. Further, the gauge 10 can be manually turned off by using the input key 20 or automatically turned off after no activity for a certain period of time.

The order of the steps 100-140 are not limiting and maybe applied in a different order or multiple steps may be performed at the same time, and additional steps can be performed and also certain steps can be not performed. For example, if no offset value is needed, step 100 can be skipped, or if the gauge 10 does not have to be re-zeroed, the zeroing step 110 can be skipped.

The present invention can be realized as computer-executable instructions in computer-readable media. The computer-readable media includes all possible kinds of media in which computer-readable data is stored or included or can include any type of data that can be read by a computer or a processing unit. The computer-readable media include, for example, and not limited to storing media, such as magnetic storing media (e.g., ROMs, floppy disks, hard disk, and the like), optical reading media (e.g., CD-ROMs (compact disc-read-only memory), DVDs (digital versatile discs), re-writable versions of the optical discs, and the like), hybrid magnetic optical disks, organic disks, system memory (read-only memory, random access memory), non-volatile memory such as flash memory or any other volatile or non-volatile memory, other semiconductor media, electronic media, electromagnetic media, infrared, and other communication media such as carrier waves (e.g., transmission via the Internet or another computer). Communication media generally embodies computer-readable instructions, data structures, program modules or other data in a modulated signal such as the carrier waves or other transportable mechanism including any information delivery media. Computer-readable media such as communication media may include wireless media such as radio frequency, infrared microwaves, and wired media such as a wired network. Also, the computer-readable media can store and execute computer-readable codes that are distributed in computers connected via a network. The computer readable medium also includes cooperating or interconnected computer readable media that are in the processing system or are distributed among multiple processing systems that may be local or remote to the processing system. The present invention can include the computer-readable medium having stored thereon a data structure including a plurality of fields containing data representing the techniques of the present invention.

An example of a computer, but not limited to this example of the computer, that can read computer readable media that includes computer-executable instructions of the present invention includes a processor that controls the computer. The processor uses the system memory and a computer readable memory device that includes certain computer readable recording media. A system bus connects the processor to a network interface, modem or other interface that accommodates a connection to another computer or network such as the Internet. The system bus may also include an input and output interface that accommodates connection to a variety of other devices.

Although an example of the remote sensing digital angle gauge is shown using the gauge of FIGS. 1 through 6, it will be appreciated that other gauges can be used. Also, although the digital angle gauge is useful to measure the caster angle in the automotive field, it can also be used for any type of angle measurement in any field.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A remote sensing angle gauge, comprising:
   a sensor unit including a sensor responding to a physical stimulus and transmitting a resulting impulse for measuring an angle;
   an interface unit separate and remote from said sensor unit and in communication with said sensor unit, said interface unit receiving a signal from the resulting impulse of said sensor unit, said interface unit determining the angle measurement according to the received signal from said sensor unit and inputted data from said interface unit;
   a display unit displaying determined angle measurements;
   a plurality of indicators displaying certain options of the inputted data being selected; and
   an input unit to select certain options in determining the angle measurement, wherein one of said options being a selection on said input unit zeroing said angle gauge with respect to an area being measured and activating at least one of said plurality of indicators displaying the zeroing.

2. The remote sensing angle gauge of claim 1, further comprising an electrical connection between said interface unit and said sensor unit.

3. The remote sensing angle gauge of claim 2, wherein the electrical connection allows for positioning of said sensor unit in a measured area and remote use of a certain distance to allow the angle measurement to be displayed on said angle gauge the certain distance from said sensor unit.

4. The remote sensing angle gauge of claim 1, further comprising a processor in said interface unit that determines the angle measurement according to the signal received from said sensor, input received from said input unit including an offset value and orientation of said sensor.

5. The remote sensing angle gauge of claim 1, further comprising a computer readable media including computer executable instruction comprising:
   a first module zeroing said angle gauge with respect to the area being measured and activating at least one of said plurality of indicators displaying the zeroing when selected through said input unit;
   a second module receiving an offset value from said input unit and storing the offset value in said memory unit for determining of the angle measurement;
   a third module receiving through said input unit a selection of a negative or positive angle according to an orientation of said sensor unit and activating at least one of said plurality of indicators displaying a selection of the orientation of said sensor; and
   a fourth module determining the angle measurement according to a signal from said sensor and input received from said input unit, the input received from said input unit including offset value and orientation of said sensor.

6. The remote sensing angle gauge of claim 1, further comprising an adaptor connected to said sensor unit to allow a connection to the area being measured, said adaptor being detachable and adjustable on said sensor unit.

7. The remote sensing angle gauge of claim 1, further comprising a securing unit on said interface unit for securing said interface unit to an object.

8. The remote sensing angle gauge of claim 1, wherein said angle is a caster angle.

9. The remote sensing angle gauge of claim 1, wherein said sensor being an accelerometer, to sense change in movement of an enclosure of said sensor unit, the change in movement being displayed on said display unit as an angle measured in degrees.

10. The remote sensing angle gauge of claim 1, further comprising of a wireless connection between said sensor unit and said interface unit.

11. The remote sensing angle gauge of claim 1, further comprising an adaptor including pins positioned on an outer surface of said sensor unit according to the location of said sensor in said sensor unit, the adaptor being detachable and adjustable on said sensor unit according to a groove on said outer surface of said sensor unit, said pins of adapter being connected to holes in the area being measured for the angle.

12. The remote sensing angle gauge of claim 2, further comprising the electrical connection being a detachable and retractable wire.

13. A method of remotely sensing an angle, comprising:
setting a zero point with respect to an area being measured on a user interface;
receiving an offset value from an input unit on said user interface and storing the offset value in a memory unit;
receiving through said input unit, a selection of an orientation of a sensor, said sensor being separate from said user interface; and
determining the angle measurement with a processor according to the data received from said sensor, input received for the offset value, and orientation of said sensor.

14. The method of claim 13, further comprising of activating at least one of a plurality of indicators displaying the zeroing when selected through said input unit.

15. The method of claim 13, further comprising of activating at least one of said plurality of indicators displaying a selection of the orientation of said sensor.

16. An apparatus for angle measurement, comprising:
a processor;
a means for sensing and converting mechanical motion into an electrical signal proportional to the acceleration value of the motion, accommodating an angle measurement according to said processor;
a means for interfacing with a user including inputting instructions and displaying determined angle measurements, displaying the determined angle measurement according to the received electrical signal from said sensing means and the inputted instructions of said interfacing means, the determining and displaying of said angle measurements being controlled by said processor, said means for interfacing being separate from said means for sensing;
a plurality of indicators displaying certain options of the inputted instructions being selected that accommodate the angle measurement;
a displaying means displaying the determined angle measurements; and
an inputting means selecting the certain options in determining the angle measurement, wherein the inputted instructions includes an offset value and orientation of said means for sensing.

17. The apparatus of claim 16, further comprising:
an electrical connection between said interfacing means and said sensing means, the electrical connection accommodating positioning said sensing means in a measured area and remote use of a certain distance accommodating a monitoring of the angle measurement displayed on the apparatus the certain distance from said sensing means;
a fastening means on a housing of said interfacing means for attachment to an area of an object remote from the area being measured; and
an adaptor means detachably and adjustably placed on an outside housing of said sensing means for fastening said sensor unit to the area of the object being measured.

18. The apparatus of claim 16, wherein:
one of said options being a selection on said inputting means zeroing said apparatus with respect to an area being measured and activating at least one of said plurality of indicators displaying the zeroing;
a second of said options being a selection through said means for interfacing receiving an offset value from said inputting means and storing the offset value in a memory unit for determining of the angle measurement; and
a third of said options being said inputting means selecting an orientation of said sensing means and activating at least one of said plurality of indicators displaying a selection of the orientation of said sensor means.

19. A remote sensing angle gauge, comprising:
a sensor unit including a sensor responding to a physical stimulus and transmitting a resulting impulse for measuring an angle;
an interface unit separate and remote from said sensor unit and in communication with said sensor unit, said interface unit receiving a signal from the resulting impulse of said sensor unit, said interface unit determining the angle measurement according to the received signal from said sensor unit and inputted data from said interface unit;
a display unit displaying determined angle measurements;
a plurality of indicators displaying certain options of the inputted data being selected; and
an input unit to select certain options in determining the angle measurement, wherein one of said options being a selection through said interface unit to receive an offset value from said input unit and storing the offset value in a memory unit for determining of the angle measurement.

20. A remote sensing angle gauge, comprising:
a sensor unit including a sensor responding to a physical stimulus and transmitting a resulting impulse for measuring an angle;
an interface unit separate and remote from said sensor unit and in communication with said sensor unit, said interface unit receiving a signal from the resulting impulse of said sensor unit, said interface unit determining the angle measurement according to the received signal from said sensor unit and inputted data from said interface unit;
a display unit displaying determined angle measurements;
a plurality of indicators displaying certain options of the inputted data being selected; and
an input unit to select certain options in determining the angle measurement, wherein one of said options being said input unit selecting an orientation of said sensor unit and activating at least one of said plurality of indicators displaying a selection of the orientation of said sensor unit.

* * * * *